US011000055B2

(12) United States Patent
Kim et al.

(10) Patent No.: US 11,000,055 B2
(45) Date of Patent: May 11, 2021

(54) METHOD FOR PREPARING GREEN CHILLI POWDER

(71) Applicants: Jung Ho Kim, Seoul (KR); Yun Rock Ham, Seoul (KR); Nagyon Kim, Seoul (KR)

(72) Inventors: Jung Ho Kim, Seoul (KR); Yun Rock Ham, Seoul (KR); Nagyon Kim, Seoul (KR)

(*) Notice: Subject to any disclaimer, the term of this patent is extended or adjusted under 35 U.S.C. 154(b) by 155 days.

(21) Appl. No.: 16/077,702

(22) PCT Filed: Feb. 13, 2017

(86) PCT No.: PCT/KR2017/001539
§ 371 (c)(1),
(2) Date: Aug. 13, 2018

(87) PCT Pub. No.: WO2017/142267
PCT Pub. Date: Aug. 24, 2017

(65) Prior Publication Data
US 2019/0090523 A1    Mar. 28, 2019

(30) Foreign Application Priority Data
Feb. 15, 2016  (KR) .................. 10-2016-0017156
Feb. 9, 2017   (KR) .................. 10-2017-0018114

(51) Int. Cl.
*A23L 27/14*     (2016.01)
*A23B 7/02*      (2006.01)
*A23B 7/04*      (2006.01)

(52) U.S. Cl.
CPC ............ *A23L 27/14* (2016.08); *A23B 7/0215* (2013.01); *A23B 7/04* (2013.01); *A23V 2002/00* (2013.01)

(58) Field of Classification Search
CPC ......... A23L 27/14; A23B 7/04; A23B 7/0215; A23V 2002/00
See application file for complete search history.

(56) References Cited

U.S. PATENT DOCUMENTS

| 3,821,436 A * | 6/1974 | Fry ................ A23G 3/346 |
| | | 426/650 |
| 2002/0086099 A1 | 7/2002 | Shim et al. |
| 2004/0096559 A1 | 5/2004 | Swanson et al. |

FOREIGN PATENT DOCUMENTS

| KR | 1019910003310 B1 | 5/1991 |
| KR | 1019980072052 A | 10/1998 |
| KR | 1020040034325 A | 4/2004 |

(Continued)

OTHER PUBLICATIONS

Guine et al. Food and Bioproducts Processing 90 ( 2012) 58-63 (Year: 2012).*

(Continued)

*Primary Examiner* — Subbalakshmi Prakash
(74) *Attorney, Agent, or Firm* — Harness, Dickey & Pierce, P.L.C.

(57) ABSTRACT

A method of manufacturing green pepper powder is disclosed. The present disclosure relates to a method of manufacturing green pepper powder, which cleans green-colored peppers, removes the pepper stems and seeds, lyophilizes the green-colored peppers without stems and seeds under predetermined conditions, and pulverizes the lyophilized product to manufacture green pepper powder.

8 Claims, 5 Drawing Sheets
(4 of 5 Drawing Sheet(s) Filed in Color)

(56) References Cited

FOREIGN PATENT DOCUMENTS

| KR | 1020100131052 A | 12/2010 |
|---|---|---|
| KR | 10-2014-0095225 A | 8/2014 |
| KR | 101582275 B1 | 1/2016 |

OTHER PUBLICATIONS

CN-102972510-A Mar. 2013 (Abstract) (Year: 2013).*
International Search Report and Written Opinion issued in PCT/KR2017/001539, dated Apr. 28, 2017; ISA/KR.
Extended European Search Report for EP Application No. 17753428.6, dated Sep. 12, 2019 (7 pages).

* cited by examiner (a)

(b)

(a)

(b)

(a)

(b)

(a)                      (b)

(a)          (b)

METHOD FOR PREPARING GREEN CHILLI POWDER

CROSS-REFERENCE TO RELATED APPLICATION

This application is a U.S. National Phase Application under 35 U.S.C. 371 of International Application No. PCT/KR2017/001539, filed on Feb. 13, 2017. This application claims priority to and benefit of under 35 U.S.C § 119(a) of Korean Patent Application No. 10-2016-0017156, filed on Feb. 15, 2016, and Korean Patent Application No. 10-2017-0018114, filed on Feb. 9, 2017. The disclosures of the above applications are incorporated herein by reference. In addition, this non-provisional application claims priority in countries, other than the U.S., with the same reason based on the Korean patent applications, the entire content of which is hereby incorporated by reference.

TECHNICAL FIELD

The present disclosure in some embodiments relates to a method of manufacturing green pepper powder.

BACKGROUND

The statements in this section merely provide background information related to the present disclosure and do not necessarily constitute prior art.

In general, pepper powder (cayenne) refers to red pepper powder that is made in the same traditional way through drying and then grounding red peppers into powder. Ever since ancient times, chili peppers in powder and paste forms have been one of the foods that accounted for a big part of world cuisines, and people have the stereotype that pepper powder is normally reddish.

Sweet pepper (pimento, paprika, etc.) powder which is sold in the US market is equally red color, which is not much different from chili pepper powder in the Korean domestic market. Peppers often used in foods are processed red peppers, which are used not only in traditional foods such as kimchi, pepper paste, and various processed foods but also in various ways during or after cooking. In contrast, green peppers, sweet peppers, etc. are dedicated to the raw use, and they have limited uses. Improved standard of living prompted the food industry to emphasize differentiation even in the same kind of food, develop various flavors, and match people's tastes following consumer preferences. The food industry, however, has been stubborn about the 'red' color convention as far as the pepper powder is concerned, failing to fully satisfy consumers' tastes.

Green peppers ripen into red peppers, during which they are subject to a threat of disease and insect damage, and are prevented therefrom mainly through pesticide spraying. However, the red peppers harvested through such pest control works are highly likely to retain pesticide even after cleaning, which can threaten the public diet.

As a result, the conventional method of producing red pepper powder, e.g., the conventional method of sun-drying green-colored peppers results in nongreen peppers with their components changed, to prohibit the manufacturing of distinctive green pepper powder.

DISCLOSURE

Technical Problem

The present disclosure in some embodiments seeks to provide a method of manufacturing green peppers, which cleans green-colored peppers, removes pepper seeds and stems, then lyophilizing the green-colored peppers without seeds and stems under predetermined conditions and pulverizing the lyophilized product to provide green pepper powder.

SUMMARY

At least one aspect of the present disclosure provides a method of manufacturing green pepper powder, including screening green-colored peppers by sorting and classifying the green-colored peppers by a plurality of levels based on a capsaicin content, performing a first cleaning for removing foreign matters from the green-colored peppers, removing pepper stems and seeds from cleaned green-colored peppers, performing a lyophilization process on the green-colored peppers without the pepper stems and the seeds to retain greenness and ingredients of the green-colored peppers, and pulverizing the lyophilized green-colored peppers to provide a green pepper powder product.

Advantageous Effects

As described above, at least one embodiment of the present disclosure can manufacture green pepper powder maintaining the vivid taste and pungentness of the green-colored pepper differently from red pepper which gives sweetness and hotness effective.

Beyond the occasional red peppers that can be harvested only in falls during open field cultivation, nonseasonal green-colored peppers, which can be harvested nonseasonally and all year round, are processed by the method of manufacturing green pepper powder according to at least one embodiment to provide green pepper powder at all times.

In addition, at least one embodiment can use harvested green-colored peppers without spraying agricultural chemicals which have been essential at the time of harvesting of red peppers, to manufacture safer and environmentally friendly green pepper powder.

Further, according to at least one embodiment, as compared with the ground red pepper, the green pepper powder has the same effect, such as the same usability, convenience, flavor (spiciness), etc., and the nature of the green pepper powder offers spices with distinctiveness in terms of sight and taste among other senses.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Hereinafter, at least one embodiment of the present disclosure will be described in detail with reference to the accompanying drawings.

Figure 1:
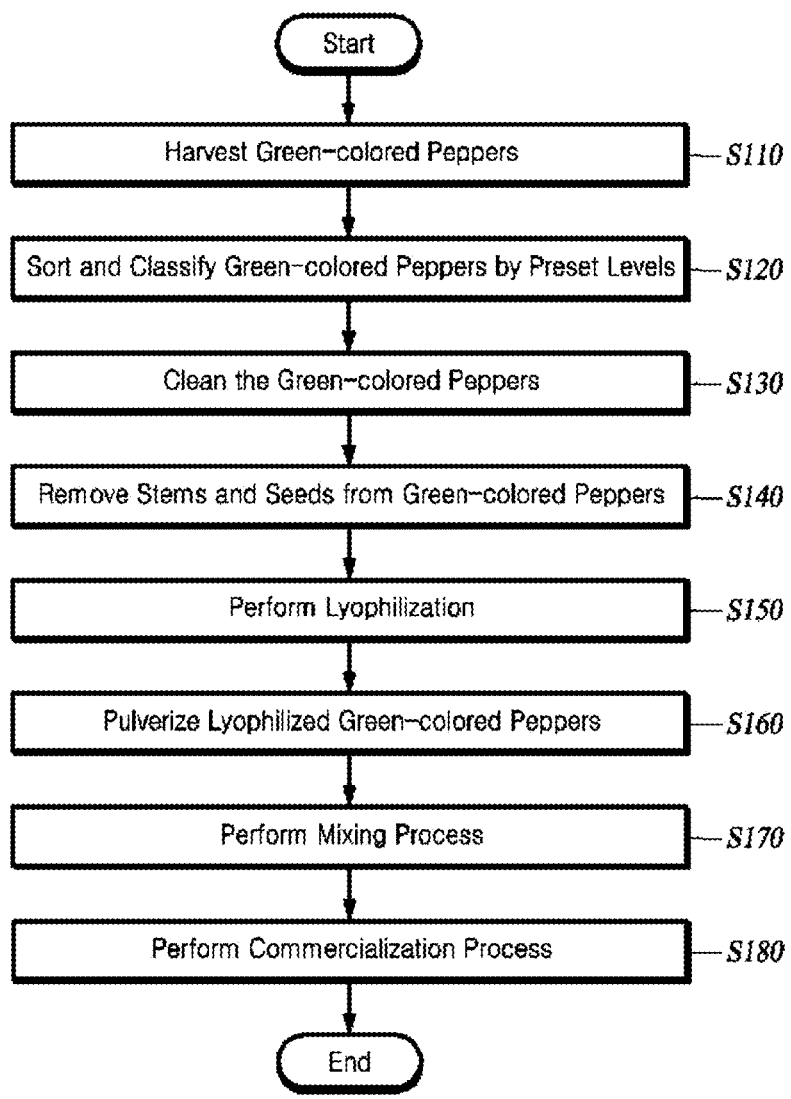
FIG. 1 is a flowchart of a method of manufacturing green pepper powder according to at least one embodiment.

FIG. 1 is a flowchart of a method of manufacturing green pepper powder according to at least one embodiment.

According to at least one embodiment, the method of manufacturing green pepper powder can produce green pepper powder having a form such as powder or granule by lyophilizing green-colored peppers to maximally preserve color, ingredients, nutrients and the like. Different ground green peppers with various degrees of spiciness may be mixed to provide controlled spiciness varieties.

Some embodiments of the present embodiment use green-colored peppers (Cheongyang peppers, general unripe peppers, Shishito peppers, jalapeno, sweet peppers, etc.) for manufacturing green pepper powder which can not only create its own demand serving as the same accompanying or supplementary food material as existing ground pepper, but also maximally preserve color, ingredients, nutrients and the like through a lyophilization process different from using the existing drying methods for conventional red pepper powder.

When dried to the sun, red peppers retain their own reddishness, while the green-colored peppers are more difficult to dry due to higher moisture content than red peppers, and are also susceptible to lose their natural greenness. This can be tackled by using, instead of the conventional drying method, a lyophilization process for drying the green-colored peppers in a short time, to obtain distinctive taste and greenness of green pepper powder.

The method of manufacturing green pepper powder according to at least one embodiment has the following processes.

Harvesting green-colored peppers (S110)→Screening green-colored peppers based on a preset level (S120) →Cleaning green-colored peppers (S130)→Removing pepper seeds and stems from green-colored peppers (S140) →Performing lyophilization (S150)→Pulverizing the lyophilized green-colored peppers (S160)→Performing mixing (S170)→Commercialization processing (S180)

—Harvesting Process (S110)—

In the harvesting process, green-colored peppers are harvested before they get colored. Here, the green-colored pepper may include Cheongyang pepper, general unripe pepper, Shishito pepper, Jalapeno, sweet pepper (pimento or paprika) among others. In some embodiments, green-colored peppers are described as being harvested directly from a farm, but they are not necessarily limited to this, and they may be bought in. These green-colored peppers have greenness and flavor peculiar to the peppers, and it is desirable to use fresh ones that are not affected by disease and insect damage.

—Screening Process (S120)—

In the screening process, the harvested green-colored peppers are sorted and classified according to the degree of spiciness, color value, type of red pepper, etc.

When screening peppers by the degree of spiciness, the screening process may use the pungency as the basis for classifying the harvested green-colored peppers into a predetermined level of spiciness. Here, the pungency may be determined by the content of capsaicin contained in the green-colored peppers. For example, in the screening process, green-colored peppers may be screened into one of mild level 0 and hot level 1, of which level 0 includes sweet pepper (pimento), general unripe pepper, etc. and level 1 includes Cheongyang pepper, Shishito pepper, jalapeno, and so on.

Meanwhile, the screening process may use the pungency as the basis for sorting and classifying the green-colored peppers into multiple stepwise levels of spiciness. For example, level 0 includes a sweet pepper (pimento) containing the least amount of capsaicin, level 1 a general unripe pepper with a higher content of capsaicin than level 0, level 2 a Shishito pepper, jalapeno, etc., which is higher in capsaicin content than level 1, and level 3 a Cheongyang pepper with higher capsaicin content than level 2.

When screening peppers by the color value, the screening process may classify the harvested green-colored peppers according to their green color density value into a predetermined level of greenness. For example, the screening process may classify the green-colored peppers based on the green color palette as shown in Table 1.

TABLE 1

| | |
|---|---|
| lawn green | #7CFC00 |
| green yellow | #ADFF2F |
| chartreuse | #7FFF00 |
| lime | #00FF00 |
| lime green | #32CD32 |
| yellow green | #9ACD32 |
| olive | #808000 |
| olive drab | #6B8E23 |
| dark olive green | #556B2F |
| fores tgreen | #228B22 |
| dark green | #006400 |
| green | #008000 |
| sea green | #2E8B57 |
| medium sea green | #3CB371 |
| dark sea green | #8FBC8F |
| light green | #90EE90 |
| pale green | #98FB98 |
| spring green | #00FF7F |
| medium spring green | #00FA9A |

When screening based on the type of pepper, the screening process may classify the harvested green-colored peppers by the type thereof. For example, the screening process may classify sweet pepper (pimento), unripe pepper, Cheongyang pepper, Shishito pepper, jalapeno, etc. by their respective types.

—Primary Cleaning Process (S130)—

The cleaning process washes the green-colored peppers having been classified by the degree of spiciness. The cleaning process is performed to remove contaminants such as dirt and agricultural chemicals that exist in the outer skin of the green-colored pepper. The cleaning process includes high-pressure air-washing in order to remove external foreign matter of the green peppers. Here, the high-pressure air desirably has a pressure of 1.5 Kpa or more.

The primary cleaning process washes out microorganisms and the remaining pesticide from the green-colored peppers after the high-pressure washing by immersing them in a diluted sterilizing solution of edible disinfectant.

The primary cleaning process is performed before removing stems from the green-colored pepper. The primary cleaning process precedes the removing of the stems from the green-colored peppers because removing the stems possibly breaks the outer pepper skin, which allows extraneous matters on the outer skin and remaining pesticide to permeate into the green-colored peppers. In addition, damaging the outer skin by removing the stems allows the components of the green-colored peppers such as capsaicin to evaporate through the damaged portion by the primary cleaning process, which can be prevented by having the primary cleaning process precede the stem removing process.

—Removing Pepper Seeds and Stems (S140)—

The process of removing pepper stems and seeds, removes the stems from the green-colored peppers and removes the seeds from inside the green-colored peppers.

The process of removing the stems of the green-colored peppers may be carried out by a person directly using scissors or by using an automated cutting machine, but it is not necessarily limited to this, and the stem may be manually cut up to the calyx, or a stem removal machine may be used to cut the stem up to the calyx with pincers. The stem remover may be composed of pincers that hold the green-colored pepper and pincers that remove the stem, and it operates to completely remove the stem of the green-colored pepper including the calyx.

The process of removing the stems of the green-colored peppers includes cutting the green-colored pepper without the stem in the longitudinal direction (from a stem end of the pepper towards the other end thereof) and removing the pepper seed inside the green-colored pepper. Here, the green-colored pepper with the stem cut off may be passed through a cylindrical seed separator to remove pepper seeds.

The process of removing pepper stems and seeds, may further blanch the green-colored peppers to prevent the capsaicin component from being evaporated at the cut portions (cut surfaces) of the green-colored peppers, and to prevent debris and other surface contaminants from externally contaminating the green-colored peppers.

—Secondary Cleaning Process—

The secondary cleaning process performs sterilization of the green-colored peppers from which the pepper stems and seeds have been removed. The secondary cleaning process may include placing in a container a harmless sterilizing solution in which a harmless sterilizing agent is dissolved in water, and immersing green-colored peppers without pepper stems and seeds in the harmless sterilizing solution for a predetermined period. The secondary cleaning process includes a mixing process performed at a predetermined cycle for allowing the harmless sterilizing solution to uniformly permeate into and out of the green-colored peppers, while the green-colored peppers without stems and seeds are immersed.

The secondary cleaning process can greatly reduce coliform bacilli and other microorganisms. The harmless sterilizing agent used in the secondary cleaning process is a product which is excellent in sterilizing ability as a sterilizing agent for food additives, good for use with agricultural products and food processing, etc., and harmless to the human body.

The secondary cleaning process in the method of manufacturing green pepper powder according to at least one embodiment is preferably performed after the removing of the pepper stems and seeds, but it is not necessarily limited to this, and the secondary pepper step may be omitted depending on the condition of the peppers, or it may be incorporated in the primary cleaning process.

—Lyophilization Process (S150)—

The lyophilization process performs freeze-drying of the completely cleaned green-colored peppers to preserve their color, ingredients, nutrients, etc.

The lyophilization process may include a low-temperature ripening process which stores and ages the cleaned green-colored peppers at a predetermined temperature. Here, the low-temperature ripening process is carried out within a temperature range of about −10° C. to −20° C. for about 1 hour to 2 hours. Temperature and time may be adjusted by considering the moisture content of the green-colored peppers.

The lyophilization process performs the low-temperature ripening and subsequently freeze-drying, and thereby enables fast manufacturing of ground green pepper having its natural color remained unaltered while minimizing variations in the external size of each green-colored pepper to be processed.

The lyophilization process is carried out using a lyophilizer that quick-freezes green-colored peppers at an ultra-low temperature of about −75° C. to −85° C., and then freeze-dries them for about 16 to 24 hours. During the lyophilization process, the green-colored peppers are better freeze-dried under the atmospheric pressure condition of about 4.2 to 5.5 mTorr. Here, the lyophilization process may proceed lyophilization in a predetermined step by step manner based on a plurality of temperatures. For example, the lyophilization process may include a precooling step carried out at about −40° C. for three hours, and a drying step performed on the green-colored peppers at a temperature of about −80° C. for 13 to 20 hours under the atmospheric pressure condition of about 5.0 mTorr by operating the relevant chamber.

The lyophilization process according to at least one embodiment may include a freezing process for quick-freezing green-colored peppers, and a sublimation process for sublimating the moisture of the frozen green-colored peppers. Meanwhile, the lyophilization process can perform the freezing process and the sublimation process simultaneously.

The freezing process is preferably a static method of freezing the green-colored peppers in contact with the surface of the lyophilizer shelf, but it is not necessarily limited to this, and liquid nitrogen may be used to freeze the green-colored peppers.

The sublimation process reduces the pressure below the triple point of water for allowing sublimation of frozen green-colored peppers to occur. The sublimation process sublimates the green-colored peppers while maintaining the minimum drying temperature (eutectic point) at which material safety is maintained. The heat provided during the sublimation process is delivered via a frozen substance with a low thermal conductivity, which prescribes the thermal variation to be narrow and the conducted heat to be low, in order to avoid melting.

The lyophilization process according to at least one embodiment may further comprise a drying step of removing the residual moisture of the lyophilized green-colored peppers. Here, although the drying process is described as being included in the lyophilization process, it is not necessarily limited thereto, and a separate drying process may be performed.

The drying process removes remaining moisture after completion of the sublimation drying, such as bound water, crystallized moisture, water that is randomly spreading in glassy material, water in cells, or absorbed water. The drying process may remove the remaining moisture by applying heat to the green-colored peppers while maintaining the vacuum state (4.2 to 5.5 mTorr). For example, the drying process may be performed within a temperature range of about 30° C. to 40° C. for 1 hour to 4 hours.

The drying process may be performed by a method such as air drying using a hanger, and mechanical drying using a drying apparatus set at predetermined constant drying conditions. Here, the drying process may be carried out in two stages at a primary drying temperature, and a secondary drying temperature, wherein the primary drying temperature stage may last at about 30° C. to 35° C. for 1 hour to 1 hour 30 minutes, and the secondary drying temperature stage may proceed at about 38° C. to 40° C. for 2 hours to 2 hours and 30 minutes. In the drying stage at the primary drying temperature, the green-colored peppers are gently dried while maintaining the maximum greenness. In the drying stage at the secondary drying temperature, the green-colored peppers can have their overall surfaces and interiors uniformly dried.

On the other hand, the lyophilization process according to at least one embodiment is described as freeze-drying the green-colored peppers after the secondary cleaning, but the present disclosure is not limited to this, and the green-colored peppers after the secondary cleaning may undergo a juice extraction or concentration processing before they are lyophilized. Further, when drying is performed in a non-light state, the green-colored peppers after the secondary cleaning may simply undergo a drying process.

—Pulverizing Process (S160)—

In the pulverizing process, the green-colored peppers which have been lyophilized are ground in the form of powder or granule. Here, the green-colored peppers after the lyophilization maintain a moisture content of about 10 to 15%.

The pulverizing process can the grind green-colored peppers after the lyophilization to produce green pepper powder in a fine powder state. In the pulverizing process according to at leas tone embodiment, the lyophilized green-colored peppers are better ground to a size of about 10 to 35 mesh.

Meanwhile, the pulverizing process may include allowing the green pepper powder in a fine powder state to absorb moisture at a preset humidity and thereby induce agglomeration among the powder particles, and re-drying the agglomerated large particles to provide green pepper powder in granulated form. The granulated green pepper powder is formed by pepper granules of a porous structure, and it has good wettability with increased dispersion and sedimentation velocity in water.

When producing green pepper powder in granulated form, the pulverizing process grinds the lyophilized green-colored pepper to a size of about 70 to 90 mesh. When pulverizing the green-colored peppers to less than 70 mesh in the pulverizing process, green pepper powder particles are too large to be manufactured in a granulated form. In addition, when pulverizing the green-colored peppers to a size exceeding 90 mesh in the pulverizing process, the particles of green pepper powder are too small to be manufactured in a granulated form, taking cost and time therefor, which is not economical. Therefore, the pulverizing process for providing granulated green pepper powder, preferably includes grinding the lyophilized green-colored peppers to a size of about 70 to 90 mesh.

—Mixing Process (S170)—

The mixing process includes mixing ground green-colored peppers at different levels or degrees of spiciness at a predetermined ratio. In other words, green-colored peppers are processed by each of different levels classified by the 'screening process' to provide ground green peppers with various levels, where the mixing process mixes ground green-colored peppers at different levels at a predetermined ratio to provide the green pepper powder with controlled color, flavor, etc.

For example, when the green-colored peppers are sorted into mild level 0 and hot level 1, the mixing process mixes first green pepper powder at level 0 with second green pepper powder at level 1 at a ratio of 2:1, to provide green pepper powder with a degree of spiciness reduced from level 1 by a predetermined first stage. Meanwhile, the mixing process, when mixing the first green pepper powder at level 0 with the second green pepper powder at level 1 at a ratio of 3:1, provides green pepper powder with a degree of spiciness reduced from level 1 by a predetermined second stage. Here, the amount of decrease in the spiciness of the second step is preferably larger than that of the first step.

The mixing process may mix the ground green-colored peppers by using hands or sticks, although it may use a vibration mixer or stirrer. For example, when using a stirrer in the mixing process, the ground green-colored peppers are preferably agitated at about 17 to 22 rpm for about 7 to 12 minutes.

By performing the mixing process, the green pepper powder is provided with the right pungency for the user. In addition, performing the mixing process can improve the flavor of green pepper powder by mixing ground green-colored peppers which are different in pepper varieties and spicy ingredients, etc.

—Commercialization Process (S180)—

The commercialization process refers to the process of sorting and commercializing ground green peppers mixed at a predetermined ratio in the mixing process according to the intended use, particle size, and degree of spiciness. The commercialization process may additionally perform an inspection process for checking the presence or absence of product abnormality, the expiration date, and so on.

The above-described method of manufacturing green pepper powder according to at least one embodiment, can produce green pepper powder, while preserving the distinctive greenness and the ingredients and nutrients of the peppers.

The green-colored peppers, which can be harvested regardless of the season throughout the year beyond the seasonal red peppers harvested only in the fall during open field cultivation, are available as fresh food materials at any time for the method of manufacturing green pepper power according to at least one embodiment. The availability of the green-colored peppers without agricultural chemical spraying which is indispensable for harvesting red peppers, contributes to manufacturing safer and environmentally friendlier green pepper powder.

With the green pepper powder provided by the method according to at least one embodiment of the present disclosure, the powder or granulated form of green-colored peppers is not only easy to use along with such ingredients as spice or sweetener in a cooking process, but also capable of adding the distinctive taste and color of green peppers or sweet peppers. Considering the ingredients and nutrients of the green-colored peppers (green pepper, sweet pepper, etc.), green pepper powder can be processed as a health supplement by putting the powder in capsules or other packages. The unprecedented greenish pepper powder can expand the range of food ingredients to choose from and contribute to the development of food culture, resulting in positive linkage effect by creating new demand.

Figure 2:
FIG. 2 (a and b) are photographs of experimental material and an experimental apparatus in the method of manufacturing green pepper powder according to at least one embodiment.
Figure 2:
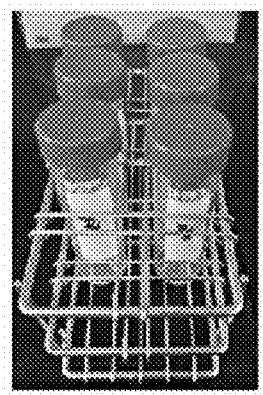
Figure 2:
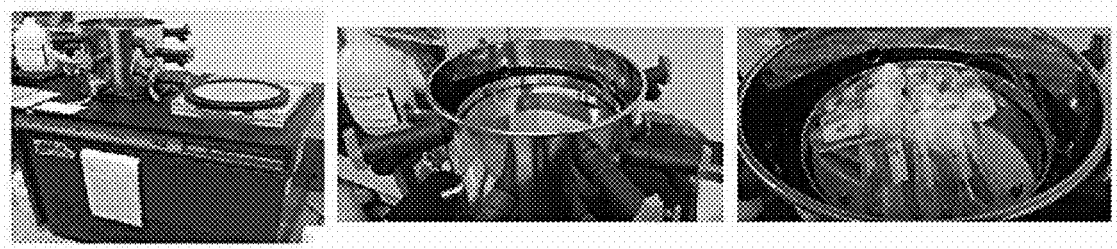

FIGS. 2 to 4 show the results of experiments for manufacturing green pepper powder by lyophilizing Cheongyang peppers and Shishito peppers. The method of manufacturing green pepper powder according to at least one embodiment works beyond the Cheongyang and Shishito peppers shown in FIGS. 2 to 4, to equally use general unripe pepper, jalapeno, sweet pepper (pimento, paprika), etc. The method in some embodiments carries out additional manufacturing processes besides the lyophilization.

FIG. 2 is photographs of experimental material and an experimental apparatus in the method of manufacturing green pepper powder according to at least one embodiment.

FIG. 2 shows at (a) the products of Cheongyang peppers and Shishito peppers from the harvesting process (S110) and the screening process (S120), and experimental containers of the respective peppers. FIG. 2 shows at (b) a lyophilizer for lyophilizing Cheongyang peppers and Shishito peppers.

As shown at (a) and (b) in FIG. 2, the respective Cheongyang peppers and Shishito peppers are put in experimental containers and lyophilized by using the lyophilizer. Here, Cheongyang peppers and Shishito peppers are better put through a temperature ripening process at a temperature of about −10° C. to −20° C. before being lyophilized.

Figure 3A:
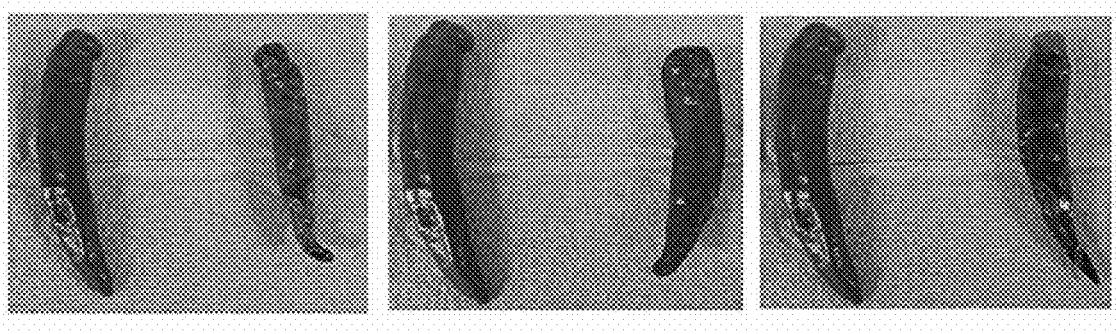
FIG. 3A (a and b), FIG. 3B (a and b), and FIG. 3C (a and b) are photographs of lyophilization and pulverizing results before removing pepper seeds in the method of manufacturing green pepper powder according to at least one embodiment.
Figure 3A:
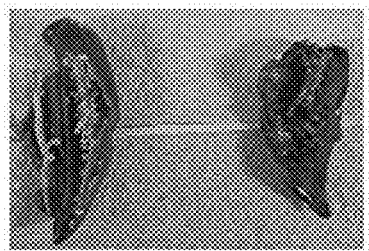
Figure 3B:
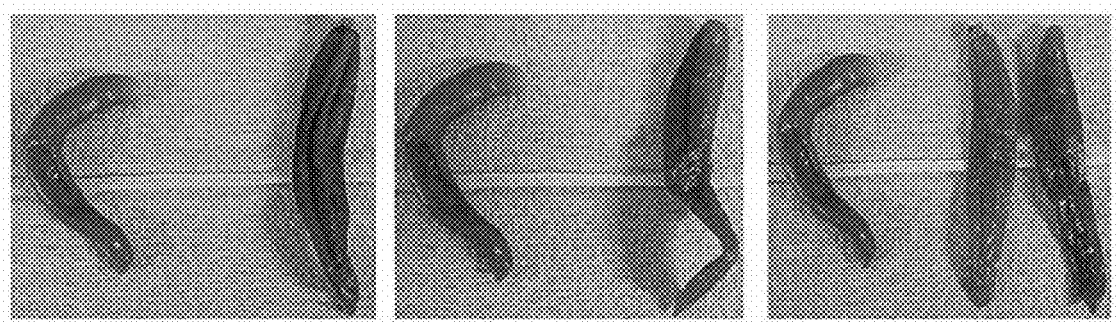
Figure 3B:
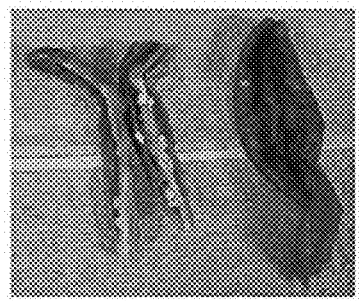
Figure 3C:
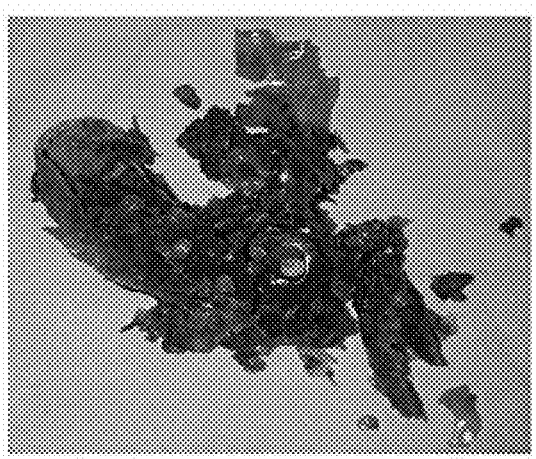
Figure 3C:
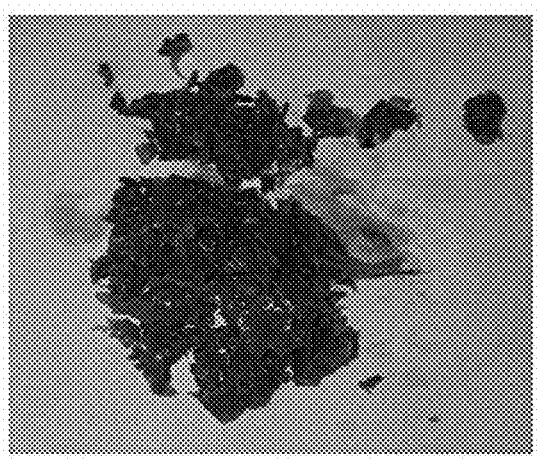

FIGS. 3A to 3C are photographs of lyophilization and pulverizing results before removing pepper seeds in the method of manufacturing green pepper powder according to at least one embodiment.

FIG. 3A shows the external form (a) and the internal form (b) of Cheongyang peppers freeze-dried in the lyophilization process (S150) omitting the process of removing pepper stems and seeds (S140). Here, the lyophilization process (S150) is performed using a lyophilizer that quick-freezes the Cheongyang peppers at an ultra-low temperature of about −75° C. to −85° C., and then freeze-dries them for 16 to 24 hours. Here, the Cheongyang peppers can be freeze-dried under the condition of about 4.2 to 5.5 mTorr.

As shown at (a) in FIG. 3A, it is confirmed that the external form of the Cheongyang peppers maintains a moisture content of 25%. Also referring to (b) of FIG. 3A, it is confirmed that the internal form of the Cheongyang peppers maintains a water content of 40%.

FIG. 3B shows an external form (a) and an internal form (b) of Shishito peppers that have been freeze-dried by the lyophilization process (S150) omitting the process of removing pepper stems and seeds (S140). Here, lyophilization process (S150) freeze-dries the Shishito peppers the same conditions as the Cheongyang peppers in FIG. 3A.

As shown at (a) in FIG. 3B, it is confirmed that the external form of the Shishito peppers maintains a moisture content of 25%. In addition, as shown at (b) in FIG. 3B, it is confirmed that in the internal form of the Shishito peppers maintains the moisture content of 40%.

FIG. 3C shows at (a) the product of pulverizing the Cheongyang peppers shown in FIG. 3A, and at (b) the product of pulverizing the Shishito peppers shown in FIG. 3B. As shown in FIG. 3C, the high moisture content results in no formation of green pepper powder.

Figure 4A:
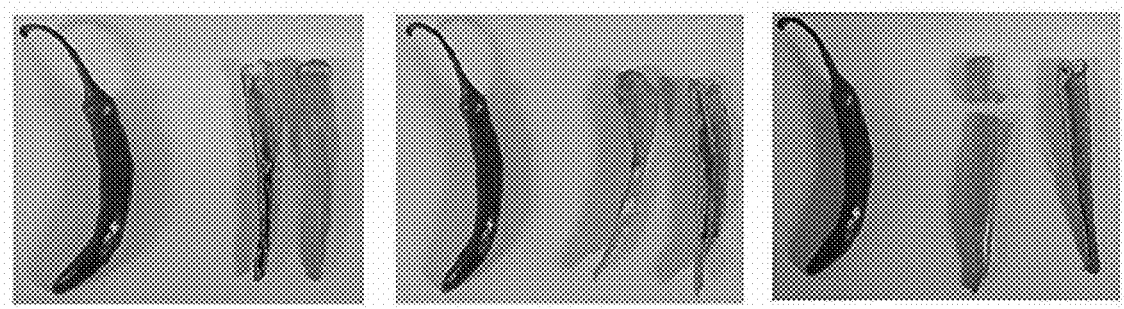
FIGS. 4A, 4B and 4C (a and b) are photographs of lyophilization and pulverizing results after removing pepper seeds in the method of manufacturing green pepper powder according to at least one embodiment.
Figure 4B:
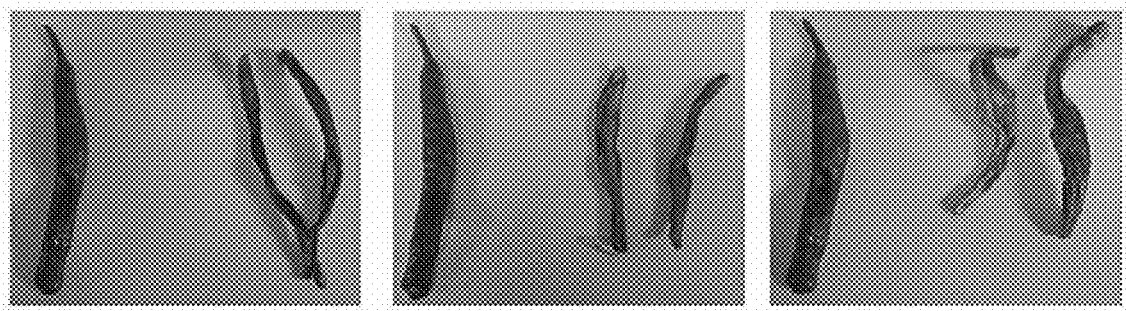
Figure 4C:
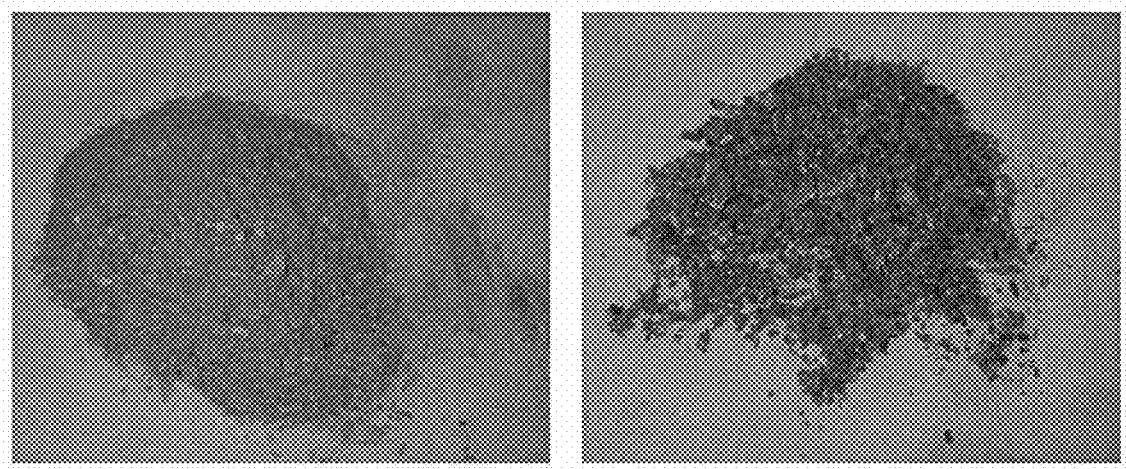

Therefore, in the case of FIG. 3C, green pepper powder can be provided in a form similar to FIG. 4C by performing an additional drying process. The additional drying process may be a method such as air drying using a hanger or mechanical drying using a drying apparatus set to predetermined constant drying conditions. In other words, green pepper powder can be provided by proceeding the product of FIG. 3C through an additional drying process and using a pulverized product obtained by re-pulverizing the product of the additional drying process. Here, the additional drying process may be carried out in two stages of the primary drying temperature and the secondary drying temperature, wherein the stage of the primary drying temperature may be performed at about 30° C. to 35° C. for 1 hour to 1 hour 30 minutes, and the stage of the secondary drying temperature may be carried out at about 38° C. to 40° C. for 2 hours to 2 hours and 30 minutes.

In the additional drying process up to the stage of primary drying temperature, the Cheongyang peppers and Shishito peppers in FIG. 3C are gently dried while retaining their own colors to the maximum, and the additional drying process up to the stage of secondary drying temperature can uniformly dry the Cheongyang peppers and Shishito peppers inside and outside overall.

FIGS. 4A to 4C are photographs of lyophilization and pulverizing results of removing pepper seeds in the method of manufacturing green pepper powder according to at least one embodiment.

FIG. 4A shows the experimental results of a Cheongyang pepper which was freeze-dried by the lyophilization process (S150) after removing its stem and seeds by the process of removing pepper stems and seeds (S140). Here, the lyophilization process (S150) is performed using a lyophilizer that quick-freezes the Cheongyang peppers at an ultra-low temperature of about −75° C. to −85° C., and then freeze-dries them for 16 to 24 hours. Here, the Cheongyang peppers can be freeze-dried under the condition of about 4.2 to 5.5 mTorr. As shown in FIG. 4A, it is confirmed that the experimental Cheongyang pepper product holds a moisture content of less than 10%.

FIG. 4B shows the experimental results of a Shishito pepper which was freeze-dried by the lyophilization process (S150) after removing its stem and seeds by the process of removing pepper stems and seeds (S140). Here, the lyophilization process (S150) freeze-dries the Shishito pepper under the same conditions as the Cheongyang pepper in FIG. 4A. As shown in FIG. 4B, the experimental Shishito pepper product is confirmed to maintain a moisture content of less than 10%.

FIG. 4C shows at (a) the pulverized product obtained by pulverizing the Cheongyang pepper shown in FIG. 4A, and at (b) the pulverized product of pulverizing the Shishito pepper shown in FIG. 4B. As shown in FIG. 4C, the mixing process (S170) may be performed using the pulverized products of the Cheongyang pepper and Shishito pepper. Through the mixing process (S170), the ground green peppers having different characteristics, for example, ground Cheongyang and Shishito peppers can be mixed at a predetermined ratio, to provide green pepper powder with controlled color, taste and the like.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:
1. A method of manufacturing green pepper powder, the method comprising:
    screening green-colored peppers by sorting and classifying the green-colored peppers by a plurality of levels based on a capsaicin content;
    performing a first cleaning to remove foreign matter from the green-colored peppers;
    removing pepper stems and seeds from cleaned green-colored peppers;
    blanching the stems/seeds-removed green-colored peppers;

lyophilizing the blanched green-colored peppers to retain greenness and ingredients of the blanched green-colored peppers, wherein the lyophilizing process includes:

quick-freezing precooled green-colored peppers at a temperature of about −75° C. to −85° C. for about 16 to 24 hours sublimating moisture from the precooled green colored peppers at a pressure below the triple point of water;

drying sublimated green colored peppers at about −80° C. for 13 to 20 hours at a pressure condition of about 5.0 mTorr; and pulverizing the dried green-colored peppers to provide a green pepper powder product;

wherein, optionally the quick-freezing and the sublimating are performed simultaneously.

2. The method of claim 1, wherein the pulverizing comprises:

separately grinding the dried green-colored peppers by each of the plurality of levels to provide multiple levels of the green pepper powder product.

3. The method of claim 2, further comprising:

mixing at least two different levels of green pepper powder products from among the multiple levels of the green pepper powder product, at a predetermined ratio, wherein the mixing comprises agitating the at least two different levels of green pepper powder products at about 17 to 22 rpm for about 7 to 12 minutes.

4. The method of claim 1, wherein the pulverizing comprises:

pulverizing the green-colored peppers that have been freeze-dried, wherein the green-colored peppers are ground to a size of about 10 to 35 mesh.

5. The method of claim 1, wherein the pulverizing comprises:

pulverizing the green-colored peppers that have been freeze-dried to a size of about 70 to 90 mesh.

6. The method of claim 1, wherein the drying comprises:
freeze-drying the green-colored peppers by in a lyophilizer set to a pressure condition of about 4.2 to 5.5 mTorr.

7. The method of claim 1 further comprising:

a pre-freezing process at a predetermined temperature before lyophilization wherein the pre-freezing process is carried out by storing and aging the green-colored peppers within a temperature range of about −10° C. to about −20° C. for about 1 hour to 2 hours.

8. The method of claim 1, further comprising a second cleaning of the green-colored peppers after removing the pepper stems and seeds by additionally washing the green-colored peppers without the pepper stems and seeds with a harmless sterilizing solution comprising a harmless sterilizing agent dissolved in water.

* * * * *